US012670133B1

(12) United States Patent
Lyons et al.

(10) Patent No.:   US 12,670,133 B1
(45) Date of Patent:      Jun. 30, 2026

(54) SYSTEMS AND METHODS FOR DETECTING ANOMALIES IN DATA RECORDS ACROSS DATABASES WITH DIFFERENT DATA SCHEMAS

(71) Applicant: BlackRock Finance, Inc., New York, NY (US)

(72) Inventors: Simon Lyons, Edinburgh (GB); Rafal Michal Jankowski, Newport (GB); Hristo Paskov, Stanford, CA (US); Andrew John McNeill, Edinburgh (GB); Stephen Poythress Boyd, Stanford, CA (US); Trevor John Hastie, Stanford, CA (US); Emmanuel Candes, Stanford, CA (US)

(73) Assignee: BlackRock Finance, Inc., New York, NY (US)

( * ) Notice: Subject to any disclaimer, the term of this patent is extended or adjusted under 35 U.S.C. 154(b) by 285 days.

(21) Appl. No.: 17/023,073

(22) Filed: Sep. 16, 2020

(51) Int. Cl.
| | |
|---|---|
| *G06F 16/215* | (2019.01) |
| *G06F 11/08* | (2006.01) |
| *G06F 11/32* | (2006.01) |
| *G06F 16/242* | (2019.01) |
| *G06F 16/27* | (2019.01) |
| *G06F 18/214* | (2023.01) |

(Continued)

(52) U.S. Cl.
CPC ............ *G06F 16/215* (2019.01); *G06F 11/08* (2013.01); *G06F 11/327* (2013.01); *G06F 16/2423* (2019.01); *G06F 16/27* (2019.01); *G06F 18/2148* (2023.01); *G06F 18/2415* (2023.01); *G06N 3/02* (2013.01)

(58) Field of Classification Search
CPC .... G06F 16/215; G06F 16/27; G06F 16/2423; G06F 11/98; G06F 11/327; G06K 9/6257; G06K 9/6277; G06N 3/02
USPC ......................................................... 707/692
See application file for complete search history.

(56) References Cited

U.S. PATENT DOCUMENTS

| | | | |
|---|---|---|---|
| 10,467,201 B1 * | 11/2019 | Merritt ................... | G06F 16/215 |
| 2002/0065752 A1 * | 5/2002 | Lewis ................... | G06Q 40/025 |
| | | | 705/35 |

(Continued)

FOREIGN PATENT DOCUMENTS

| | | | | |
|---|---|---|---|---|
| WO | WO-2012130489 A1 * | 10/2012 | ....... | G06F 17/30371 |
| WO | WO-2020201247 A1 * | 10/2020 | ........... | G06F 16/316 |

*Primary Examiner* — Tony Mahmoudi
*Assistant Examiner* — Kamal K Dewan
(74) *Attorney, Agent, or Firm* — Haynes and Boone, LLP

(57) ABSTRACT

Embodiments described herein provide a probabilistic approach using a probabilistic classifier to detect anomalous categorical data, e.g., data points in non-numerical data fields. Specifically, the probabilistic classifier may generate a conditional probability distribution of a data attribute, such as the "country of origin" field in a bond data record, conditioned on various other data attributes of the bond data record obtained from different databases. The generated conditional probability corresponding to the data attribute of the store non-numerical value, e.g., the "country of origin" equals a certain country code as stored, may indicate whether a data anomaly exists with the stored value for this particular data attribute. When an anomaly is detected with a data attribute, the categorical value associated with the highest conditional probability corresponding to the data attribute may be provided as the suggested value for the data attribute.

19 Claims, 9 Drawing Sheets

100

Primary Database 120

Bond Record 102

Bond Record 103

Classifier 105

Server 130

Data Error Alert 106

User Device 110

Secondary Database 140

(51) Int. Cl.
*G06F 18/2415* (2023.01)
*G06N 3/02* (2006.01)

(56) References Cited

U.S. PATENT DOCUMENTS

| 2003/0212519 | A1* | 11/2003 | Campos | G06F 18/2321 |
| | | | | 707/E17.058 |
| 2007/0094181 | A1* | 4/2007 | Tayebnejad | G06Q 40/08 |
| | | | | 706/21 |
| 2007/0294187 | A1* | 12/2007 | Scherrer | H04L 63/1425 |
| | | | | 705/75 |
| 2015/0379430 | A1* | 12/2015 | Dirac | G06N 20/00 |
| | | | | 706/12 |
| 2019/0066204 | A1* | 2/2019 | Teixeira | G06Q 40/04 |
| 2019/0287171 | A1* | 9/2019 | Parmar | G06F 21/10 |
| 2019/0377807 | A1* | 12/2019 | Dean | G06F 16/84 |
| 2020/0111100 | A1* | 4/2020 | Adjaoute | G06Q 20/4016 |
| 2020/0334228 | A1* | 10/2020 | Matyska | G06Q 30/0185 |
| 2020/0379868 | A1* | 12/2020 | Dherange | G06F 11/3438 |
| 2020/0382536 | A1* | 12/2020 | Dherange | H04L 63/1425 |
| 2021/0049512 | A1* | 2/2021 | Chatterjee | G06N 5/025 |
| 2021/0334656 | A1* | 10/2021 | Sjögren | G05B 23/024 |
| 2021/0374610 | A1* | 12/2021 | Dirac | G06N 20/00 |
| 2021/0383407 | A1* | 12/2021 | Pati | G06N 20/00 |
| 2022/0012591 | A1* | 1/2022 | Dalli | G06N 3/082 |
| 2022/0036137 | A1* | 2/2022 | Muselli | G06K 9/6277 |
| 2022/0044133 | A1* | 2/2022 | Otto | G06K 9/6267 |
| 2022/0076164 | A1* | 3/2022 | Conort | G06N 20/00 |
| 2022/0230192 | A1* | 7/2022 | Jackson | G06N 3/126 |
| 2022/0253699 | A1* | 8/2022 | Hoshen | G06N 3/08 |
| 2022/0374399 | A1* | 11/2022 | Kementsietsidis | G06F 16/211 |
| 2022/0391763 | A1* | 12/2022 | Dirac | G06N 20/00 |

* cited by examiner

| Attribute Values in Database 140 |
| --- |
| Actual/Actual |
| Actual/360 |
| 30/360 |
| Actual/365 (Fixed) |
| Actual/365 (366 Leap Year - ISDA) |
| 30/360 (Compounded Interest) |
| 30/365 |
| 30/360 (ICMA) |
| Actual/365 (366 Leap Year) |
| Actual/364 |
| Bus/252 |
| 365/365 |
| 28/360 |
| 30/360 US |
| 30/360 US (NASD) |
| 30/360 BMA |
| 30/360 (ISDA) |
| 30/360 IT |
| 30/360 SIA |
| 30E/360 |
| 30E/360 (ISDA) |
| 30E+/360 |
| NL/365 (No Leap Year) |
| 7/360 |
| 30/360 with gross up |

103

| Attribute Values in Database 120 |
| --- |
| 30E/360 |
| 30P/360 |
| ACT/360 |
| ACT/365 |
| ACT/366 |
| ACT/ACT |
| ACT/TSY |
| BUS/252 |
| C30/360 |
| D20/360 |
| N/A |
| N30/360 |
| NL/365 |

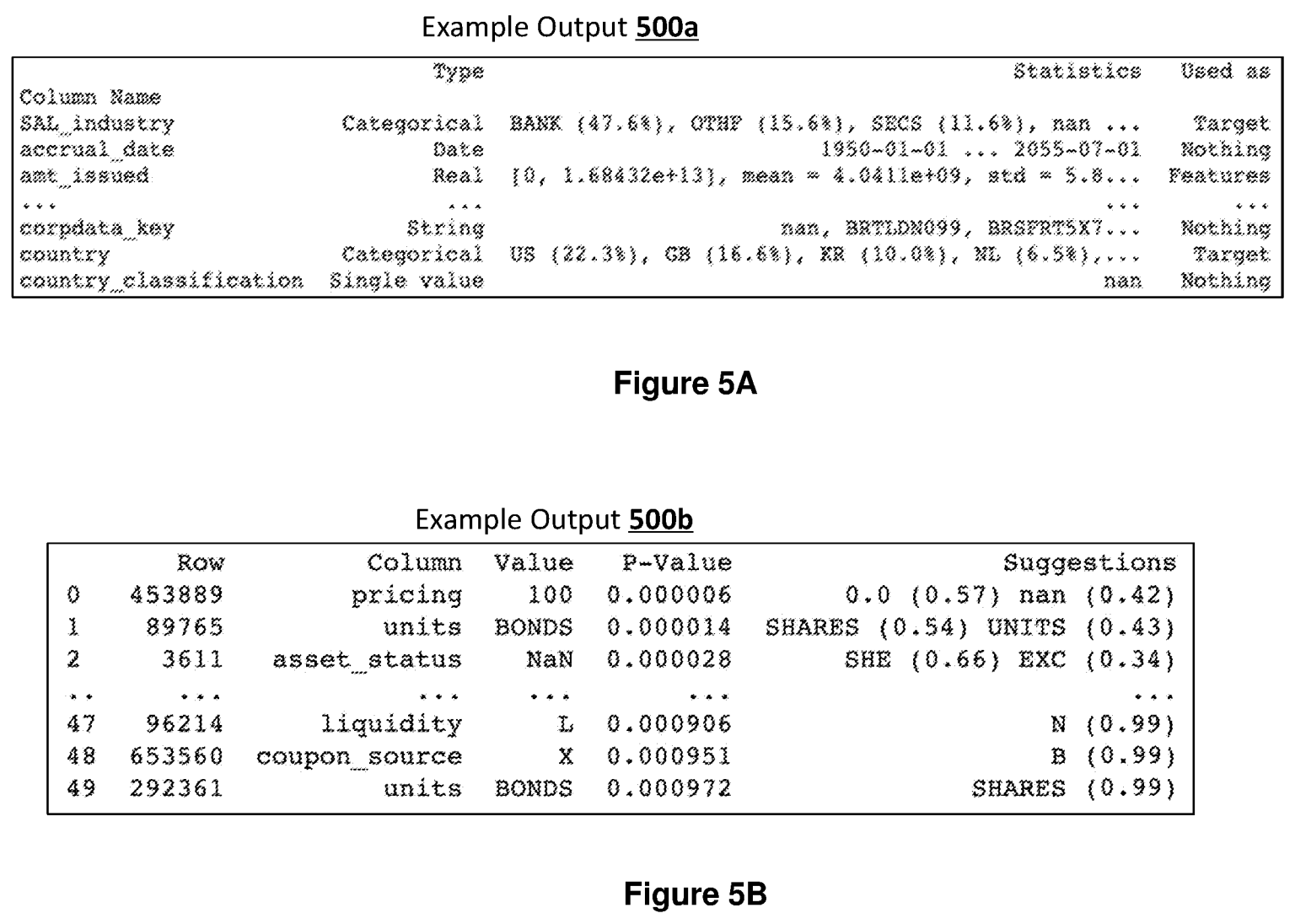

Example Output 500a

| Column Name | Type | Statistics | Used as |
|---|---|---|---|
| SAL_industry | Categorical | BANK (47.6%), OTHP (15.6%), SECS (11.6%), nan ... | Target |
| accrual_date | Date | 1950-01-01 ... 2055-07-01 | Nothing |
| amt_issued | Real | [0, 1.68432e+13], mean = 4.0411e+09, std = 5.0... | Features |
| ... | ... | ... | ... |
| corpdata_key | String | nan, BRTLDM099, BRSPRTSX7... | Nothing |
| country | Categorical | US (22.3%), GB (16.6%), XR (10.0%), XL (6.5%),... | Target |
| country_classification | Single value | nan | Nothing |

Figure 5A

Example Output 500b

| | Row | Column | Value | P-Value | Suggestions |
|---|---|---|---|---|---|
| 0 | 453889 | pricing | 100 | 0.000006 | 0.0 (0.57) nan (0.42) |
| 1 | 89765 | units | BONDS | 0.000014 | SHARES (0.54) UNITS (0.43) |
| 2 | 3611 | asset_status | NaN | 0.000028 | SHE (0.66) EXC (0.34) |
| ... | ... | ... | ... | ... | ... |
| 47 | 96214 | liquidity | L | 0.000906 | N (0.99) |
| 48 | 653560 | coupon_source | X | 0.000951 | B (0.99) |
| 49 | 292361 | units | BONDS | 0.000972 | SHARES (0.99) |

Figure 5B

Example Output 600b

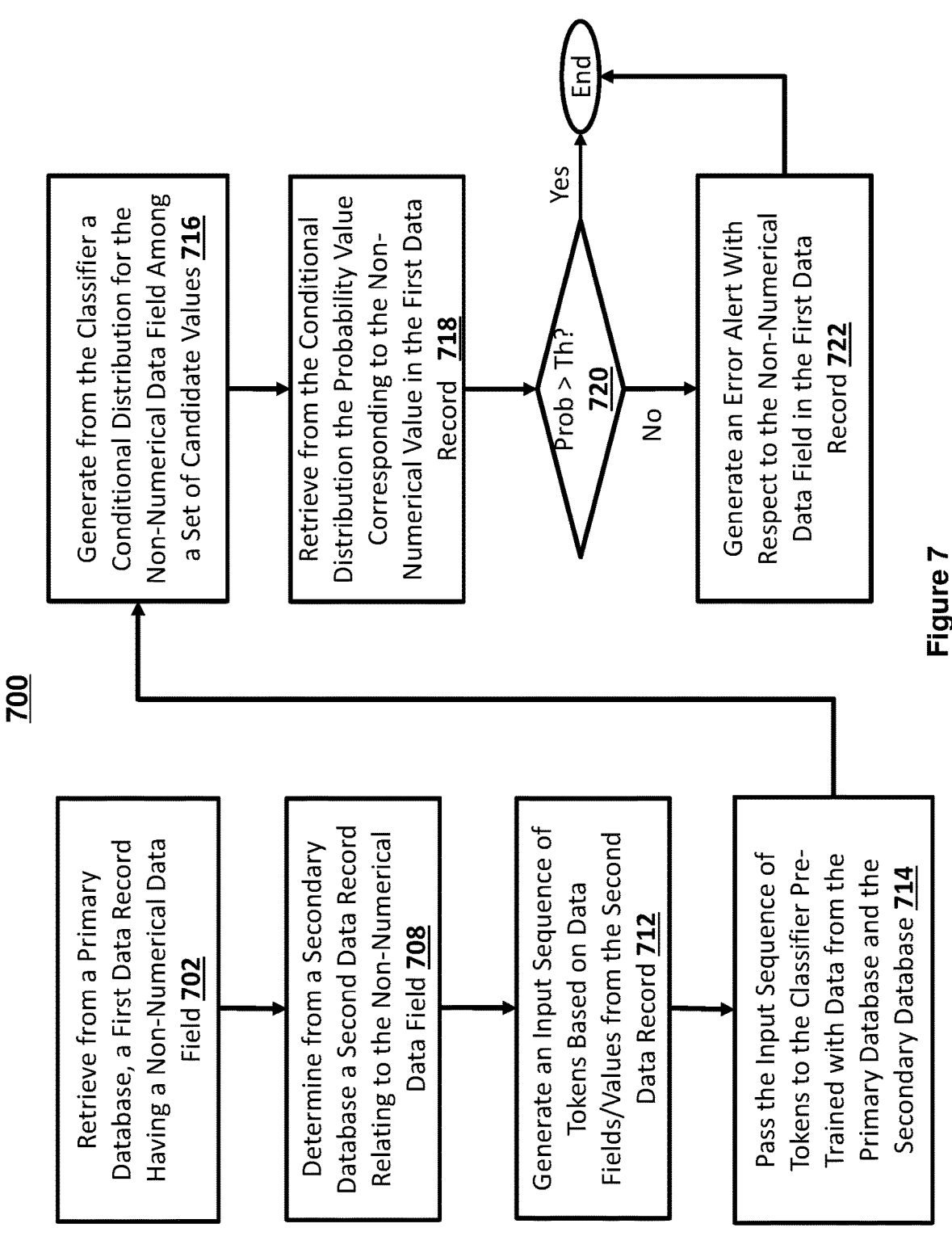

700

Retrieve from a Primary Database, a First Data Record Having a Non-Numerical Data Field 702

Determine from a Secondary Database a Second Data Record Relating to the Non-Numerical Data Field 708

Generate an Input Sequence of Tokens Based on Data Fields/Values from the Second Data Record 712

Pass the Input Sequence of Tokens to the Classifier Pre-Trained with Data from the Primary Database and the Secondary Database 714

Generate from the Classifier a Conditional Distribution for the Non-Numerical Data Field Among a Set of Candidate Values 716

Retrieve from the Conditional Distribution the Probability Value Corresponding to the Non-Numerical Value in the First Data Record 718

Prob > Th? 720

Yes

No

Generate an Error Alert With Respect to the Non-Numerical Data Field in the First Data Record 722

End

Figure 7

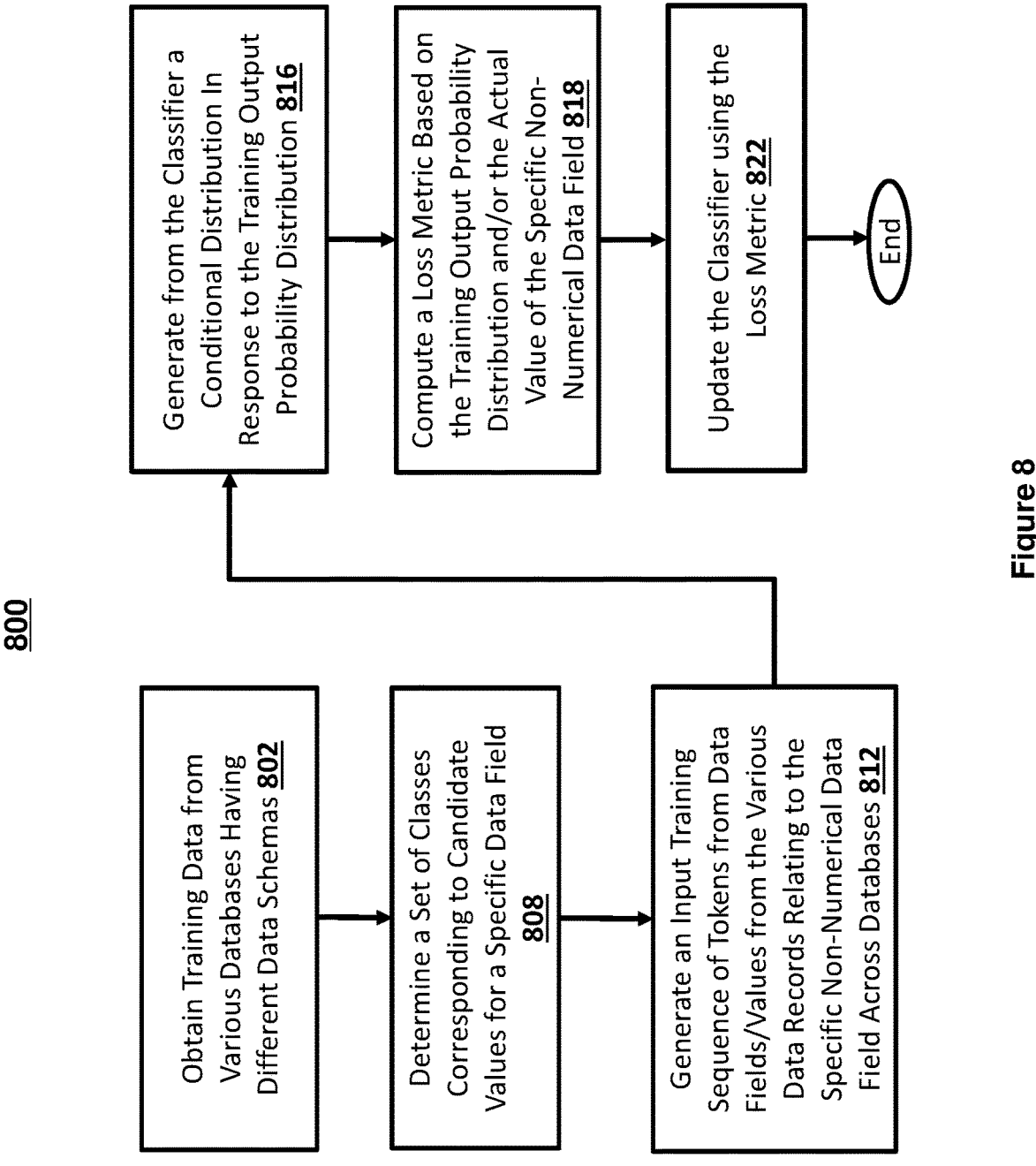

800

Obtain Training Data from Various Databases Having Different Data Schemas 802

Determine a Set of Classes Corresponding to Candidate Values for a Specific Data Field 808

Generate an Input Training Sequence of Tokens from Data Fields/Values from the Various Data Records Relating to the Specific Non-Numerical Data Field Across Databases 812

Generate from the Classifier a Conditional Distribution In Response to the Training Output Probability Distribution 816

Compute a Loss Metric Based on the Training Output Probability Distribution and/or the Actual Value of the Specific Non-Numerical Data Field 818

Update the Classifier using the Loss Metric 822

End

Figure 8

SYSTEMS AND METHODS FOR DETECTING ANOMALIES IN DATA RECORDS ACROSS DATABASES WITH DIFFERENT DATA SCHEMAS

TECHNICAL FIELD

The present application generally relates to data anomaly management, and more specifically to detecting anomalies in a data record based on data of different data schemas across databases.

BACKGROUND

Institutions usually obtain data records from various data vendors, who may organize and store data at databases that are electronically accessible via a computer system. Different data vendors or databases may store a data record in different schemas. For example, data that is presented in one column of the data schema used in one database may be split across multiple columns in the data schema used in a different database. For another example, data may be stored at different levels of granularity at different databases, e.g., one database may use a timestamp that is accurate to each second while another database may label the timestamp of a data event that is accurate to a respective hour. Sometimes, the accuracy of data records in the different databases may need to be verified for specific downstream tasks, such as database maintenance, financial transaction verification, and/or the like.

BRIEF DESCRIPTION OF THE DRAWINGS

FIG. 3 illustrates example data attributes from different data schemas across databases, according to one embodiment;

FIGS. 5A-5B illustrates example data outputs of anomaly detection described in FIG. 4, according to an embodiment;

FIG. 7 is a logic flow diagram illustrating an exemplary process for detecting data anomalies in a data record based on a classifier using various data records of different data schemas across databases, according to an embodiment;

FIG. 8 is a logic flow diagram illustrating an exemplary process for training the classifier shown in FIGS. 1, 2, and 4 using data records from different databases, according to an embodiment.

Figure 1:
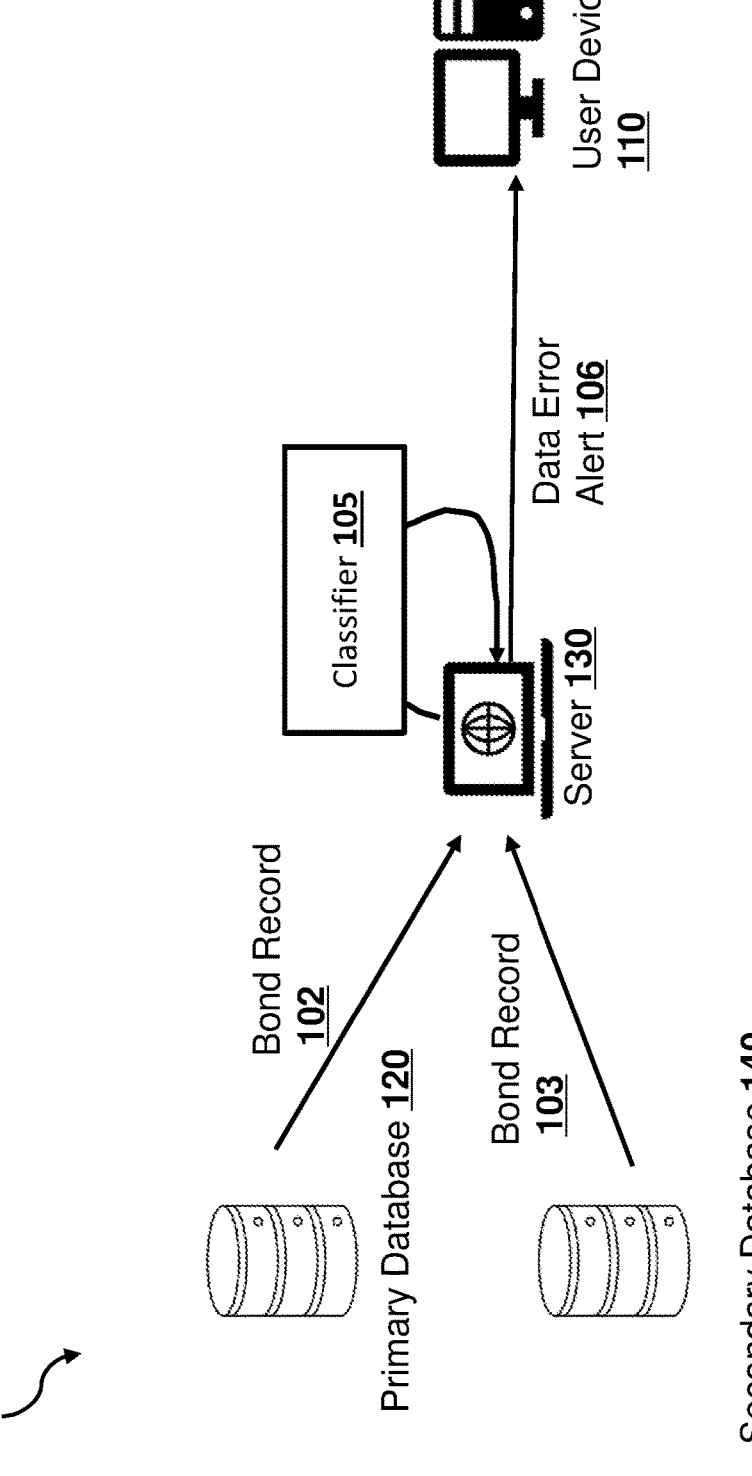
FIG. 1 is a block diagram illustrating example data flows between multiple devices for data anomaly detection, according to one embodiment described herein.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for detecting anomalies in a data record based on data of different data schemas across databases. Systems suitable for practicing methods of the present disclosure are also provided.

Data users may store data that is compliant with various formats or data schemas in different databases. As used herein, the term "compliant with" refers to confirming to a certain requirement. For example, a data record compliant with a certain data schema refers to that the data record has a data structure and/or data attributes that are defined by the certain data schema.

Some data schemas may include data attributes that often have non-numerical data values, referred to as categorical data. For example, a financial institution may obtain data relating to a financial instrument. Such financial data may include data attributes such as bond name (e.g., "treasury 30 year," etc.), "issuance date" (e.g., "10-10-2010." etc.), "maturity date" (e.g., "10-10-2040," etc.), "issuer name" (e.g., "treasury," etc.), "security level" (e.g., "high," etc.), "currency type" (e.g., "USD." etc.), "tenor" (e.g., "30y," etc.), country of origin (e.g., "US." etc.), and/or the like, most of which may correspond to a non-numerical value. In addition, the categorical data may appear in different data schemas or formats if obtained from different databases. For instance, the data attribute "issuance date" may be stored in the format of "MM-DD-YYYY" in one database but may appear in a different format of "YY/MM/DD" in another database.

For another example, healthcare institutions such as hospitals, insurance companies, and/or the like may each store healthcare related data in their respective databases. The non-numerical (categorical) data attribute in a healthcare data record, such as the date of service, the treatment code, and/or the like, may often take different formats in different databases, e.g., the hospital patient database, the insurance company medical claim database, and/or the like.

Existing database quality control tools for identifying and reviewing data anomalies in the data records are generally restricted in the types of data to assess, and mostly only capable of evaluating or verifying the accuracy of numerical data entries. Thus, it remains challenging to interpret or evaluate categorical data having non-numerical values, in particular, as the different schemas of categorical data across databases may add to the complexity to verify the accuracy of data attributes. Error detection in non-numerical categorical data in data records nowadays still largely relies on human manual review, which can be costly and inefficient.

In view of the need for a mechanism to interpret or evaluate categorical data, embodiments described herein provide a probabilistic approach using a probabilistic classifier to detect anomalous categorical data, e.g., data points in non-numerical data fields. Specifically, the probabilistic classifier may generate a conditional probability distribution of a data attribute, such as the "country of origin" field in a bond data record, conditioned on various other data attributes of the bond data record obtained from different databases. The generated conditional probability corresponding to the data attribute of the store non-numerical value, e.g., the "country of origin" equals a certain country code as stored, may indicate whether a data anomaly exists with the stored value for this particular data attribute.

In one embodiment, when data anomaly is detected with the stored value for the particular data attribute, the generated conditional probabilities may be used to provide a suggestion for the data attribute. For example, the country code associated with the highest conditional probability for the data attribute "country of origin" may be determined as a suggestion to correct the value associated with "country of origin."

FIG. 1 provides a block diagram 100 illustrating an example aspect of using a classifier 105 to identify data anomalies in data records across different databases, according to embodiments described herein. Diagram 100 shows a server 130, various databases 120 and 140, a user device 110, and/or the like interact with each other, e.g., via a communication network. In diagram 100, two databases, a primary database 120 and a secondary database 140, are shown for illustrative purposes, while more than two databases may be communicative with the server 130.

In one embodiment, the server 130 may receive various data records from the databases. For example, the server 130 may receive a bond record 102 storing information of a bond from the primary database 120 and receive a bond record 103 storing information of the same bond from the secondary database 140. In one implementation, the server 130 may obtain the bond record 103 of the same bond from the secondary database 140 to verify data attributes in the bond record 102. For example, the server 130 may assess whether the data attribute "country of origin" having the value of "MX" (e.g., the country code for Mexico) in the bond record 102 is accurate.

In one embodiment, the server 130 may input all the information relating to the bond obtained from (both) numerical and non-numerical data attributes of the bond record 102 and bond record 103, except the data attribute "country of origin" having the value of "MX" in the bond record 102, to the classifier 105. The classifier 105 may in turn generate a conditional probability distribution of the data attribute "country origin" across different candidate values, conditioned on all the input information relating to the bond. For example, the probabilistic classifier 105 may determine that the probability that the data attribute "country origin" takes a value of "MX" is 0.99, and the probability that the data attribute "country origin" takes a value of "JP" (e.g., the country code for Japan) is 0.001.

The server 130 may generate a data error alert 106 based on the conditional probability distribution. For example, the data error alert 106 may take a form as an electronic message, which include data point relating to the generated probability distribution of the data attribute "country origin." In one implementation, the data error alert 106 may further include an analysis comparing the conditional probability distribution with the non-numerical value of the data attribute "country origin" in the bond record 102. For example, the data error alert 106 may flag an anomaly when the data attribute "country origin" in the bond record 102 equals "JP." but the classifier 105 outputs the probability that the data attribute "country origin" equals "JP" is lower than a pre-defined threshold, e.g., 0.3, 0.4, 0.45, and/or the like.

In one embodiment, the server 130 may send the data error alert 106 to a user device 110, e.g., in the form of an electronic mail, a system message, an instant message, a cloud file transfer, and/or the like.

Figure 2:
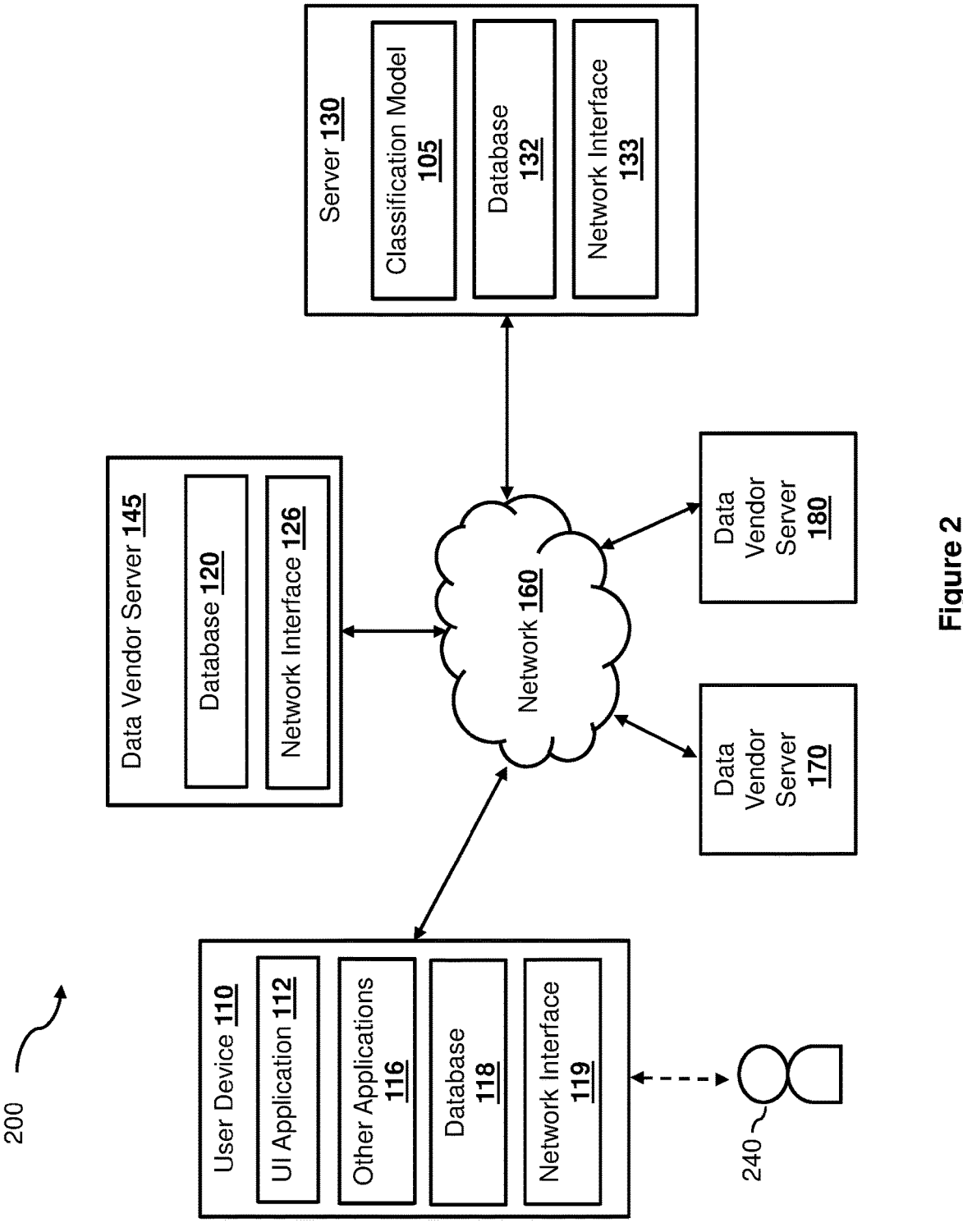
FIG. 2 is a block diagram of a networked system suitable for implementing the processes described in FIG. 1 and other embodiments described herein, according to an embodiment.

FIG. 2 is a block diagram 200 of a networked system suitable for implementing the processes described in FIG. 1 and other embodiments described herein, according to an embodiment. In one embodiment, block diagram 200 shows a system including the user device 110 which may be operated by user 240, data vendor servers 145, 170 and 180, server 130, and other forms of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

The user device 110, data vendor servers 145, 170 and 180, and the server 130 may communicate with each other over a network 160. User device 110 may be utilized by a user 240 to access the various features available for user device 110, which may include processes and/or applications associated with the server 130 to receive an output data anomaly report.

User device 110, data vendor server 145, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 160.

User device 110 may be implemented as a communication device that may utilize appropriate hardware and software configured for wired and/or wireless communication with data vendor server 145 and/or the server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 of FIG. 2 contains a user interface (UI) application 112, and/or other applications 116, which may correspond to executable processes, procedures, and/or applications with associated hardware. For example, the user device 110 may receive a data anomaly message from the server 130 and display the data anomaly message via the UI application 112. In other embodiments, user device 110 may include additional or different modules having specialized hardware and/or software as required.

In various embodiments, user device 110 includes other applications 116 as may be desired in particular embodiments to provide features to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a data anomaly message from the server 130. Other applications 116 may include device interfaces and other display modules that may receive input and/or output information. For example, other applications 116 may contain software programs, executable by a processor, including a graphical user interface (GUI) configured to provide an interface to the user.

User device 110 may further include database 118 stored in a transitory and/or non-transitory memory of user device 110, which may store various applications and data and be utilized during execution of various modules of user device 110. Database 118 may store received data anomaly messages, user review data relating to the data anomaly message, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 119 adapted to communicate with data vendor server 145 and/or the server 130. In various embodiments, network interface component 119 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 145 may correspond to a server that hosts the database 120 to provide data records to the server 130. For example, the database 120 may be a financial information database storing information relating to various financial instruments. A bond record in the database 120, for instance, may include data attributes such as the country of origin, issuer, issue date, tenor, currency, expiration date, and/or the like. The database 120 may be implemented by one or more relational database, distributed databases, cloud databases, and/or the like.

The data vendor server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 145 may send data records retrieved from the database 120, via the network interface 126, to the server 130.

Figure 4:
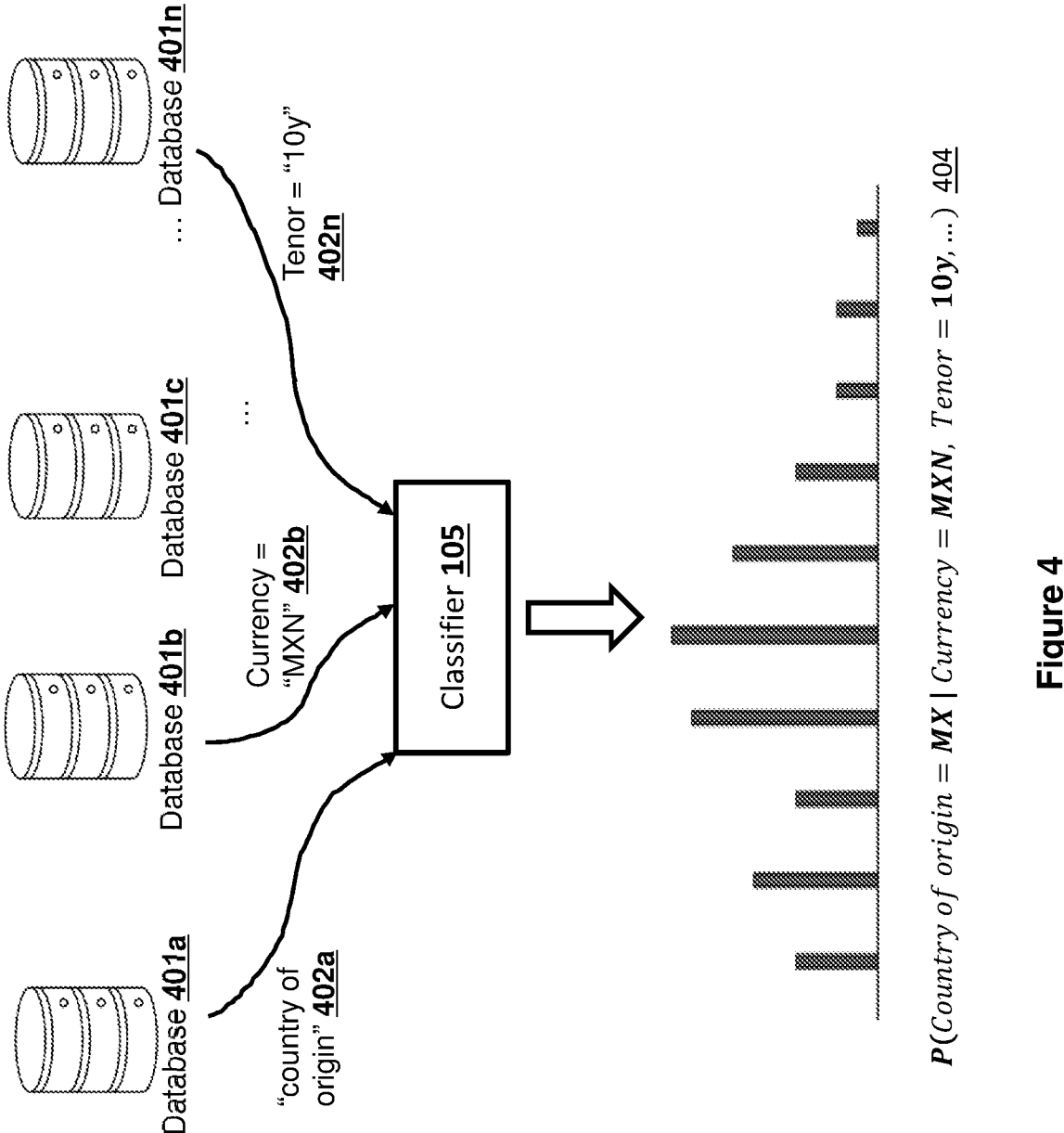
FIG. 4 illustrates an example embodiment of generating a conditional probability indicating a likelihood of data anomalies given various different input data attributes across databases, according to an embodiment.

The server 130 may be housed with a classification model 105 (also referred to herein as a classifier 105 in FIGS. 1 and 4). In some implementations, the classification model 105 may be a neural network model that is based on hardware, software or a combination thereof. For example, the classification model 105 may receive data records from the database 120 in the data vendor server 145 via the network 160.

The database 132 may be stored in a transitory and/or non-transitory memory of the server 130. In various embodiments, for example, the database 120 may be a financial information database storing information relating to various financial instruments. In one implementation, the database 132 may store data records obtained from the data vendor server 145. In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or data vendor servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 200.

FIG. 3 illustrates example segments of data records of different schemas, according to one embodiment. Segments from bond record 102 and bond record 103 are shown for illustrative purpose. As shown, the bond record 102 and the bond record 103 have different data schemas. For instance, bond record 102 may show a data attribute value of "30E/ 360" indicating a final term of the bond, e.g., 30 days in the interest reset period divided by 360, while the bond record 103 may have the data attribute value in a different format, such as "30E/360 (ISDA)" or "30E+/360." For another example, bond record 103 may have a data attribute value of "actual/360" indicating that the interest is calculated using an actual number of days in a month (usually 30 or 31) over 360, while bond record 102 may have the data attribute value in a different format, such as "ACT/360." Therefore, the data records across different databases may have different schemas or different formats of data fields even for the data item, such as the same bond, the same financial instrument, and/or the like.

FIG. 4 illustrates an example process of classifying a data attribute of a data record based on various related data attributes from different databases, according to one embodiment described herein. In one embodiment, if the data attribute "country of origin" in a bond record is to be evaluated, various data records of the same bond may be obtained from various databases 401a-n. For example, various different data attribute values from different databases, such as the data attribute currency having a value of "MXN" 402b, data attribute tenor having a value of "10y" 402n, and/or the like, to be the input conditions for the classifier 105 to determine a conditional probability distribution of the data attribute "country of origin" 402a.

In one embodiment, the conditional probability of the data attribute "country of origin" 402a may be generated based on the data attribute values of the same bond stored at other databases 401b-401n. Alternatively, the conditional probability may be generated based on all data attributes of the same bond stored at all databases 401a-n (e.g., including the primary database 401a), except the data attribute "country of origin" 402a itself.

For example, the data attributes 402b-n as related to the target data attribute 402a may be identified by extracting one or more key terms corresponding to the target data attribute "country of origin" and/or the corresponding bond record from database 401a. A query may be formed on the databases 402b-n based on the one or more key terms to query for the records of the same bond across different databases 402b-n.

In one embodiment, even if the different data attribute values from different databases 401a-n may take different data schemas, the data values are 402b-n are input to the classifier 105 as they are, e.g., without being converted or conformed to a universal data format or schema for the classifier 105 to dissect the respective meaning of the data values. For example, the data attribute currency having a value of "MXN" 402b, the data attribute tenor having a value of "10y" 402n, and/or the like, are input to the classifier 105 as tokens of "MXN," "10y," and/or the like, without being converted to a standard data format such as "Mexican Peso," "10 years," and/or the like. In this way, new data attributes can be added as conditions for the target data attribute "country of origin" by appending the new data attributes to the input sequence as tokens irrespective of the different data schema.

In one embodiment, the classifier 105 may be a probabilistic classification model that is configured to generate a conditional probability distribution 404 of the input variable "country of origin" 402a based on the input conditions 402b-n. For instance:

P(Country of origin=MX|Currency=MXN, Tenor=10y, . . . )=0.99
P(Country of origin=JP|Currency=MXN, Tenor=10y, . . . )=0.001 and/or the like.

For another example, when the classifier 105 is configured to evaluate the data attribute "144a status" in a bond record, the generated conditional probability may be:

P(144a Status=Public|Currency=USD, Settle Location=Depository Trust, . . . )=0.8,
P(144a Status=Public|Currency=AUD, Settle Location=AustraClear, . . . )=0.02, and/or the like.

In one implementation, the generated conditional probability 404 may be included in a data error alert message 106. The data error alert message 106 may compare the generated conditional probability 404 with the data attribute value as stored in the bond record to indicate whether it is usual or calls for further inspection and review. For example, if the data attribute "country of origin" has a stored value of "MX," and P(Country of origin=MX|Currency=MXN, Tenor=10y, . . . )=0.99, the data attribute may be annotated as "reasonable." But when the the data attribute "country of origin" has a stored value of "JP," P(Country of origin=JP|Currency=MXN, Tenor=10y, . . . )=0.001, the data attribute may be flagged as an alert for further inspection.

In one implementation, the classifier 105 may be used to jointly evaluate the accuracy of two data attributes of a bond record. For example, a joint conditional probability distribution for the data attribute "country of origin" and the data attribute "tenor" may be determined by the classification model to evaluate the accuracy of the combination of "country of origin"=MX and "tenor=10y," e.g., P(Country of origin=JP, Tenor=10y|Currency=MXN, . . . ). The joint conditional probability indicates whether a combination of actual values of the target data attribute and the second data attribute in the first data record is an anomaly.

In another implementation, the classifier 105 may be a natural language processing model, which may receive the data attribute values 402b-n and form a sequence by concatenating the data attribute values 402b-n as the context input. Thus, the classification model 105 may predict a conditional distribution of the token for "country of origin" conditioned on the context input using next token prediction.

FIGS. 5A-5B provide example segments of output messages from the classifier described in relation to FIGS. 1-4, according to one embodiment described herein. For example, example output message 500a in FIG. 5A shows the categorical data attribute "SAL_industry" has a 47.6% probability of being "BANK," 15.6% probability of being "other," 11.6% probability of being "SECS," and/or the like, and the data attribute "country" has a 22.3% probability of being "US." 16.6% probability of being "GB." 10.0% probability of being "KR," 6.5% probability of being "NL," and/or the like.

For another example, example output message 500b in FIG. 5B shows the row number and the corresponding column name of a data attribute and compare the actually stored value of the data attribute with the generated probability value to provide suggestions. For instance, on the row "453889" under the column name "pricing," the data attribute value for "pricing" is "100." The generated probability of the data attribute "pricing" taking the value "100" is only "0.000006," which may be lower than a pre-threshold and may trigger further review and inspection of the accuracy of the respective data attribute.

In some implementations, based on the generated conditional probability for the data attribute, a suggested value for the data attribute may be made, e.g., based on the candidate values having the highest probability. For example, as shown in example output 500b, for the data attribute "pricing." the value "0.0" having a probability of 0.57, and the value "nan" having a probability of 0.42 may be suggested, as likely to be more accurate than the stored value of 100.

Figures 6A, 6B:
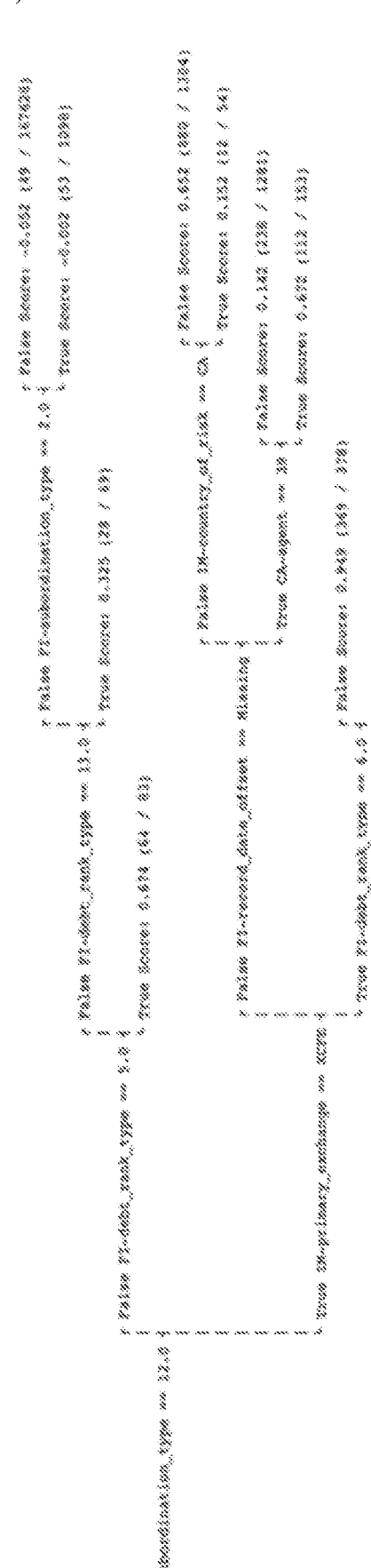
FIGS. 6A-6B provide data diagrams illustrating example decision trees for connecting a target data attribute from the primary database with data attributes from one or more secondary databases, according to one embodiment described herein.

FIGS. 6A-6B provide data diagrams illustrating example decision trees for connecting a target data attribute from the primary database with data attributes from one or more secondary databases, according to one embodiment described herein. As described in relation to FIG. 4, in one example, to verify the accuracy of the data attribute "country of origin" 402a from a bond record in database 401a, various data attributes 402b-n from secondary databases 401b-n are input to the classifier 105 as context. The tree structures shown in the example outputs 600a-b illustrate how a target data attribute to be verified is linked to other data attributes from different databases such that the accuracy of the target data attribute can be evaluated.

Specifically, a decision tree structure has a root of the target data attribute to be evaluated and shows a link between the first data attribute and sequentially connected data attributes from other databases down the different branches of the tree structure. A truth score is computed by the classification model for each root to leaf path indicating a conditional likelihood of each data attribute being the designated value is true or false along the sequentially connected nodes along the respective root to leaf path. For example, starting from the root node in example output 600a, the data attribute "primary_currency_code" which has a stored value of "USD" has two branches showing the possibility of "TRUE" or "FALSE" in a binary tree structure. If the data attribute value is "TRUE," the log-odds score "4.293" is provided, which is generated by the classifier. In addition, the two numbers in the form of (X/Y) are given, where X denotes the number of bonds that match with the data attribute (e.g., having the "primary_currency_code"=USD), and Y denotes the total number of bonds in the respective branch level. For example, 55,534 bonds out of a total of 55,576 bonds that have the primary currency code as "USD."

If the data attribute value is "FALSE," the tree structure further links the data attribute "primary_currency_code"=USD to another data attribute from a different database, e.g., "offering_type"=missing. [Under the node "offering_type"=missing, the tree structure again provides the "TRUE" branch with a log-odds score that the "offering_type"=missing might be true, and the "FALSE" branch that given "offering_type"=missing is false, links to a different data attribute "accretion_basis"=3.0. The decision tree may then be expanded to illustrate the data integrity of various different data attributes such as "offering_type." "accretion_basis," "source_material_code," and/or the like along the root to leaf path of the decision tree.

Example output 600*b* provides a similar decision tree structure for evaluating the data attribute "subordination_type"=12.0. For example, the data attribute "subortination_type"=2.0 may be linked to a data attribute "primary_exchange"=XCFE from a different database under the "TRUE" branch, while being linked to another data attribute "debt_rank_type"=5.0 from another database under the "FALSE" branch. The decision tree may be further expanded in a similar way to link to different data attribute as context for evaluating the original data attribute "subordination_type." In this way, the decision tree structures in example outputs 600*a-b* provide an illustrative format to show how the data attributes from different (secondary) databases are linked to the target data attribute to be evaluated and affect the verification of the target data attribute.

FIG. 7 is a flow diagram of an exemplary process 700 for generating a data error alert of a non-numerical data field in a data record, according to an embodiment. One or more of the processes of process 700 may be implemented, at least in part, in the form of executable code stored on non-transitory, tangible, machine-readable media that when run by one or more processors may cause the one or more processors to perform one or more of the processes. In some embodiments, process 700 may be performed by the server 130 in FIGS. 1-2. It is worth noting that additional processes, steps and/or implementations may be omitted, performed in a different sequence, or combined as desired or appropriate.

Process 700 begins with step 702, wherein a processor (e.g., at the server 130) may retrieve, from a first database (e.g., primary database 120) storing a first plurality of data records compliant with a first data schema, a first data record (e.g., bond record 102) having at least a first data attribute compliant with the first data schema. For example, the bond record 102 may have data attributes such as "country_of_origin," "currency_code" that have values according to a specific data schema.

At step 708, the processor may determine, from a second database (e.g., secondary database 140) storing a second plurality data records compliant with a second data schema different from the first data schema, a second data record (e.g., bond record 104) as related to the first data attribute. For example, as described in relation to FIG. 3, bond records 102 and 104 may have different data schemas.

At step 712, the processor may generate an input set of tokens based on data attributes of the second data record that are compliant with the second data schema. For example, as described in relation to FIG. 4, despite various different data schemas, the values of different data attributes are treated as input tokens and are input to the classifier 105.

At step 714, the input set of tokens are input to a classifier that is pre-trained with a set of classes corresponding to a set of candidate values for the first data attribute based on data from the primary database (e.g., database 120) and the secondary database (e.g., database 140). For example, the classifier 105, which may be a classification neural network, f may be pre-trained with data from various databases 401*a-n* to predict the value of data attribute "country of origin" among all candidate country codes.

At step 716, the classifier may generate a conditional distribution (e.g., probability 404) of the first data attribute conditioned on the second data record among the set of candidate values.

At step 718, the processor may determine whether the first data attribute is an anomaly based on an actual value corresponding to the first data attribute in the first data schema and the conditional distribution of the first data attribute among the set of candidate values. Specifically, the processor may retrieve from the conditional distribution the probability value corresponding to the non-numerical data attribute in the first data record, e.g., the stored value for attribute "country of origin" is "MX," and the generated conditional probability P(Country of origin=MX|Currency=MXN,Tenor=10y, . . . )=0.99.

At step 720, the processor may compare the conditional probability with a pre-defined threshold. For example, when P(Country of origin=MX|Currency=MXN, Tenor=10y, . . . )=0.99>Th=0.6, the processor may consider the data attribute "country of origin"=MX is accurate and no anomaly is found. Process 700 thus ends.

Otherwise, in a different example, when P(Country of origin=MX|Currency=MXN, Tenor=10y, . . . )=0.32<Th=0.6, the processor may consider the data attribute "country of origin"=MX is inaccurate and flag anomaly. For example, at step 722, an error alert (e.g., message 106) may be generated and transmitted to a user device 110. The error alert may include an example data chart listing the conditional probability similar to example outputs 500*a-b* shown in FIGS. 5A-5B, and/or include a decision tree illustrating how the data attribute is evaluated with other data attributes from different databases as context as shown in FIGS. 6A-6B. Process 700 may end after step 722.

FIG. 8 is a flow diagram of an exemplary process 800 for training a classification neural network model for classifying a target data attribute based on various other data attributes from different databases, according to an embodiment. One or more of the processes of process 800 may be implemented, at least in part, in the form of executable code stored on non-transitory, tangible, machine-readable media that when run by one or more processors may cause the one or more processors to perform one or more of the processes. In some embodiments, process 800 may be performed by the server 130 in FIGS. 1-2. It is worth noting that additional processes, steps and/or implementations may be omitted, performed in a different sequence, or combined as desired or appropriate.

At step 802, training data may be obtained from various databases (e.g., databases 401*a-n*) having different data schemas. At step 808, a set of classes corresponding to candidate values for a specific data field may be determined.

For example, for the data attribute/field "country of origin," the candidate values may be a list of country codes. In some implementations, the candidate values may take a format of the data schema used for the primary database. For example, the candidate values may be a list of country codes, instead of country names, if the data schema in the primary database adopts country codes for the data attribute "country of origin."

At step 812, an input training set of tokens may be generated from data fields/values from the various data records relating to the specific non-numerical data field across databases. Specifically, as described in relation to FIG. 4, even if the various data attributes from different databases have different schemas or formats, the data attributes are treated as tokens to form the training input sequence.

At step 816, the classification neural network model generates a conditional distribution in response to the training input sequence. At step 818, a loss metric based on the training output probability distribution and/or the actual value of the specific non-numerical data field may be computed, e.g., the binary cross-entropy loss. At step 822, the computed loss metric may be used to update the classification model, e.g., via backpropagation.

Thus, in this way, different secondary databases may be added to the mechanism to verify data attributes in the primary database, as long as the classifier is pre-trained with data attributes in the newly added secondary database.

Figure 9:
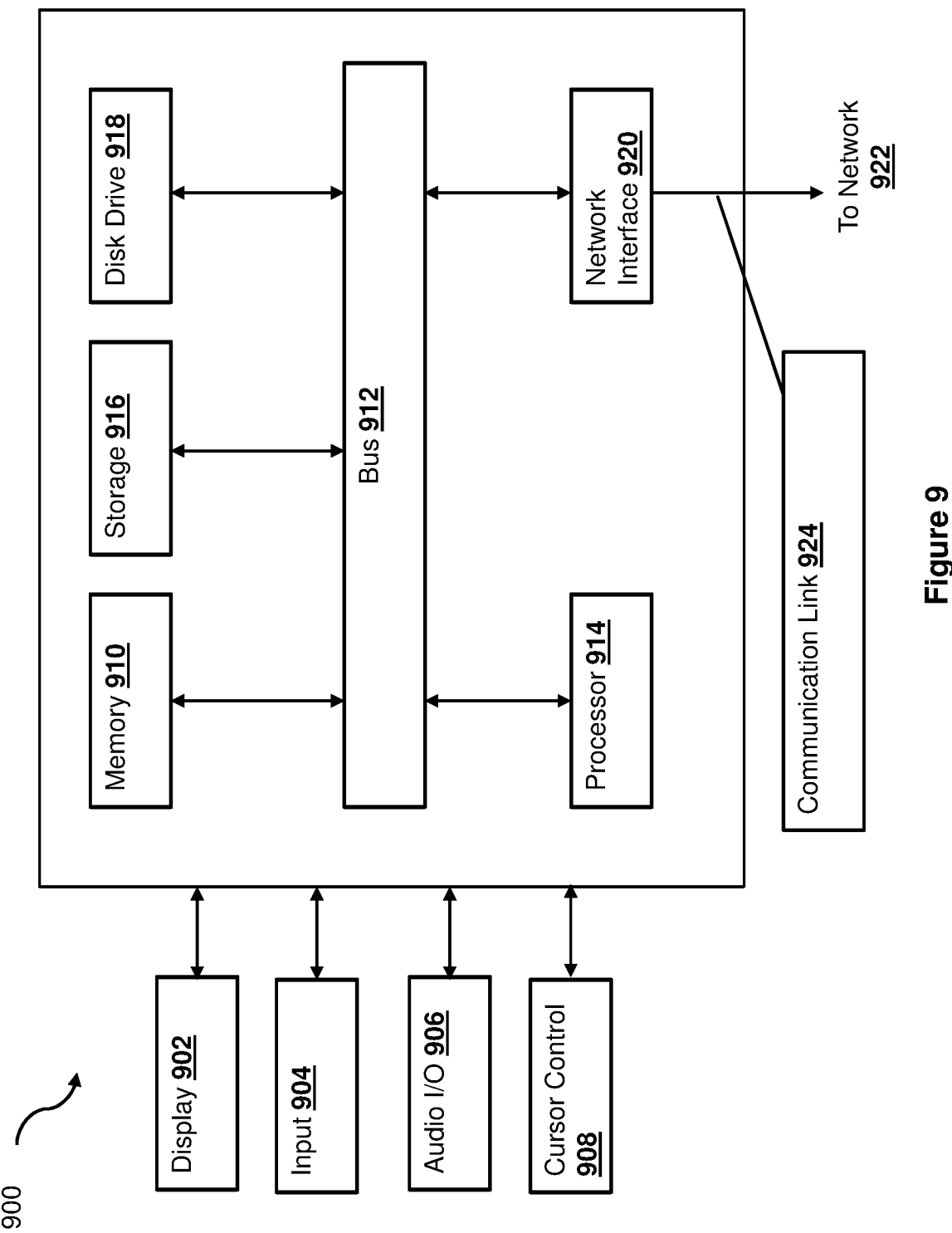
FIG. 9 is a block diagram illustrating example components of a computing device for implementing embodiments described in FIGS. 1-8, according to one embodiment.

FIG. 9 is a block diagram of a computer system 900 suitable for implementing one or more components shown in FIGS. 1-2 and performing one or more processes shown in FIGS. 4 and 7-8, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the position detection of webpage elements described herein according to the process 300.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method for anomaly detection of categorical data, the method comprising:

retrieving, from a first database storing a first plurality of data records compliant with a first data schema, a first data record having at least a first data attribute having an actual value that takes a format compliant with the first data schema;

determining, by a processor, from a second database storing a second plurality data records compliant with a second data schema different from the first data schema, a second data record as related to the first data attribute;

determining, from a third database storing a third plurality data records compliant with a third data schema different from the first data schema or the second data schema, a third data record as related to the first data attribute;

generating, by the processor, an input set of tokens formed by data attributes of the second data record that are compliant with the second data schema;

appending data attributes from the third data record as tokens to the input set of tokens irrespective of a difference among the first, the second and the third data schemas;

passing the input set of tokens to a neural network based classification model that is pre-trained with a set of classes corresponding to a set of candidate values for the first data attribute;

generating, from the neural network based classification model, a conditional distribution of a predicted value of the first data attribute that belongs to the first data record from the first database, using an input of the input set of tokens comprising the data attributes in the second data record that is from the second database and the data attributes from the third data record that is from the third database, wherein the neural network based classification model is trained by:

obtaining training data of at least a first set of data records compliant with the first data schema and at least a second set of data records compliant with the second data schema, wherein at least one data record of the first set of data records contains the first data attribute;

generating, by the neural network based classification model, a training output probability distribution for the first data attribute of the at least one data record that belongs to the first set of data records based on a training input comprising at least a set of data attributes relating to the first data attribute but belonging to the second set of data records; and training the neural network based classification model based on a loss metric comparing the training output probability distribution for the first data attribute and an actual value of the first data attribute from the at least one data record of the first set data records;

determining whether the first data attribute is an anomaly based on the actual value compliant with the first data schema and the conditional distribution of the predicted value of the first data attribute among the set of candidate values;

determining, from the second database, a fourth data record as related to a second data attribute of the first data record; and generating, by the trained neural network based classification model, a joint conditional probability distribution for the first data attribute and the second data attribute, wherein the joint conditional probability distribution indicates whether a combination of actual values of the first data attribute and the second data attribute in the first data record is an anomaly.

2. The method of claim 1, wherein the first data attribute corresponds to the set of candidate values, and each candidate value from the set of candidate values is compliant with the first data schema other than a numerical value.

3. The method of claim 1, wherein determining the second data record as related to the first data attribute comprises:

extracting one or more key terms corresponding to the first data attribute and the first data record; and forming a query on the second database based on the one or more key terms for the second data record.

4. The method of claim 1, further comprising:

incorporating a second data attribute from the first data record into the input set of tokens.

5. The method of claim 4, wherein the data attributes of the second data record that are compliant with the second data schema and the second data attribute that is compliant with the first data schema are each read by the processor as a token irrespective of a difference between the first data schema and the second data schema.

6. The method of claim 1, wherein training the neural network based classification model further comprises updating at least one or more parameters of the neural network based classification model based on the loss metric.

7. The method of claim 1, wherein determining whether the first data attribute is an anomaly based on an actual value corresponding to the first data attribute in the first data schema and the conditional distribution of the first data attribute among the set of candidate values further comprises:

determining whether a respective conditional probability corresponding to the actual value of the first data attribute is greater than a threshold; and generating an error message when the respective conditional probability is lower than the threshold.

8. The method of claim 7, further comprising:

in response to determining that the respective conditional probability corresponding to the actual value of the first data attribute is lower than the threshold, determining a suggested value corresponding to a highest probability among the conditional distribution of the first data attribute.

9. A system for anomaly detection of categorical data, the system comprising:

a memory storing a classification model;

a communication interface configured to retrieve, from a first database storing a first plurality of data records compliant with a first data schema, a first data record having at least a first data attribute having an actual value that takes a format compliant with the first data schema; and a processor configured to:

determine, from a second database storing a second plurality data records compliant with a second data schema different from the first data schema, a second data record as related to the first data attribute;

determine, from a third database storing a third plurality data records compliant with a third data schema different from the first data schema or the second data schema, a third data record as related to the first data attribute;

generate an input set of tokens based on data attributes of the second data record that are compliant with the second data schema;

append data attributes from the third data record as tokens to the input set of tokens irrespective of a difference among the first, the second and the third data schemas;

pass the input set of tokens to a neural network based classification model that is pre-trained with a set of classes corresponding to a set of candidate values for the first data attribute;

generate, from the neural network based classification model, a conditional distribution of a predicted value of the first data attribute that belongs to the first data record from the first database, using an input of the input set of tokens comprising the data attributes in the second data record that is from the second database and the data attributes from the third data record that is from the third database, wherein the neural network based classification model is trained by:

obtaining training data of at least a first set of data records compliant with the first data schema and at least a second set of data records compliant with the second data schema, wherein at least one data record of the first set of data records contains the first data attribute;

generating, by the neural network based classification model, a training output probability distribution for the first data attribute based on a training input comprising at least a set of data attributes from the second set of data records; and training the neural network based classification model based on a loss metric comparing the training output probability distribution and a value of the first data attribute from the at least one data record of the first set data records;

determine whether the first data attribute is an anomaly based on the actual value compliant with the first data schema and the conditional distribution of the predicted value of the first data attribute among the set of candidate values;

determine, from the second database, a fourth data record as related to a second data attribute of the first data record; and generate, by the trained neural network based classification model, a joint conditional probability distribution for the first data attribute and the second data attribute, wherein the joint conditional probability distribution indicates whether a combination of actual values of the first data attribute and the second data attribute in the first data record is an anomaly.

10. The system of claim 9, wherein the first data attribute corresponds to the set of candidate values, and each candidate value from the set of candidate values is compliant with the first data schema other than a numerical value.

11. The system of claim 9, wherein the processor is further configured to determine the second data record as related to the first data attribute by:

extracting one or more key terms corresponding to the first data attribute and the first data record; and forming a query on the second database based on the one or more key terms for the second data record.

12. The system of claim 11, wherein the processor is further configured to:

incorporate a second data attribute from the first data record into the input set of tokens.

13. The system of claim 12, wherein the data attributes of the second data record that are compliant with the second data schema and the second data attribute that is compliant with the first data schema are each read by the processor as a token irrespective of a difference between the first data schema and the second data schema.

14. The system of claim 9, wherein the processor is further configured to determine whether the first data attribute is an anomaly based on an actual value corresponding to the first data attribute in the first data schema and the conditional distribution of the first data attribute among the set of candidate values by:

determining whether a respective conditional probability corresponding to the actual value of the first data attribute is greater than a threshold; and generating an error message when the respective conditional probability is lower than the threshold.

15. The system of claim 14, wherein the processor is further configured to determine a suggested value corresponding to a highest probability among the conditional distribution of the first data attribute in response to determining that the respective conditional probability corresponding to the actual value of the first data attribute is lower than the threshold.

16. The system of claim 14, wherein the error message includes a decision tree showing a link between the first data attribute to sequentially connected data attributes from other databases down a tree structure.

17. The system of claim 16, wherein the decision tree shows a truth score computed by the classification model for each root to leaf path indicating a conditional likelihood of the first data attribute conditioned on the sequentially connected data attributes along the respective root to leaf path.

18. A non-transitory processor-readable medium storing processor-executable instructions for anomaly detection of categorical data, the instructions being executable by a processor to perform operations comprising:

retrieving, from a first database storing a first plurality of data records compliant with a first data schema, a first data record having at least a first data attribute having an actual value that takes a format compliant with the first data schema;

determining, by a processor, from a second database storing a second plurality data records compliant with a second data schema different from the first data schema, a second data record as related to the first data attribute;

determining, from a third database storing a third plurality data records compliant with a third data schema different from the first data schema or the second data schema, a third data record as related to the first data attribute;

generating, by the processor, an input set of tokens formed by data attributes of the second data record that are compliant with the second data schema;

appending data attributes from the third data record as tokens to the input set of tokens irrespective of a difference among the first, the second and the third data schemas;

passing the input set of tokens to a neural network based classification model that is pre-trained with a set of classes corresponding to a set of candidate values for the first data attribute;

generating, from the neural network based classification model, a conditional distribution of a predicted value of the first data attribute that belongs to the first data record from the first database, using an input of the input set of tokens comprising the data attributes in the second data record that is from the second database and the data attributes from the third data record that is from the third database, wherein the neural network based classification model is trained by:

obtaining training data of at least a first set of data records compliant with the first data schema and at least a second set of data records compliant with the second data schema, wherein at least one data record of the first set of data records contains the first data attribute;

generating, by the neural network based classification model, a training output probability distribution for the first data attribute based on a training input comprising at least a set of data attributes from the second set of data records; and training the neural network based classification model based on a loss metric comparing the training output probability distribution and a value of the first data attribute from the at least one data record of the first set data records;

determining whether the first data attribute is an anomaly based on the actual value compliant with the first data schema and the conditional distribution of the predicted value of the first data attribute among the set of candidate values;

determining, from the second database, a fourth data record as related to a second data attribute of the first data record; and generating, by the trained neural network based classification model, a joint conditional probability distribution for the first data attribute and the second data attribute, wherein the joint conditional probability distribution indicates whether a combination of actual values of the first data attribute and the second data attribute in the first data record is an anomaly.

19. A method for anomaly detection of categorical data, the method comprising:

retrieving, from a first financial database storing a first plurality of financial instrument records compliant with a first financial data schema, a first financial instrument record having at least a first non-numerical data attribute compliant with the first financial data schema;

receiving a request to verify a data accuracy of the first non-numerical data attribute in the first financial instrument record;

obtaining, from at least a second financial database storing a second plurality of financial instrument records compliant with a second financial data schema different from the first financial data schema, a second financial data record relating to a same financial instrument with the first financial instrument record, wherein the second financial data record has a second non-numerical data attribute compliant with the second financial data scheme;

obtaining, from a third financial database storing a third plurality of financial instrument records compliant with a third financial data schema different from the first financial data schema and the second financial data scheme, a third financial data record relating to the same financial instrument with the first financial instrument record, wherein the third financial data record has a third non-numerical data attribute compliant with the third financial data scheme;

generating, by the processor, an input set of tokens based on the first non-numerical data attribute and the second non-numerical data attribute irrespective of their respective different data schema;

append data attributes from the third data record as tokens to the input set of tokens irrespective of a difference among the first, the second and the third data schemas;

passing the input set of tokens to a neural network based classification model that is pre-trained, with datasets from both the first financial database and the second financial database, for classifying an input into a set of classes corresponding to a set of candidate values for the first non-numeric data attribute, wherein the neural network based classification model is trained by:

obtaining training data of at least a first set of data records compliant with the first data schema and at least a second set of data records compliant with the second data schema, wherein at least one data record of the first set of data records contains the first data attribute;

generating, by the neural network based classification model, a training output probability distribution for the first data attribute based on a training input comprising at least a set of data attributes from the second set of data records; and training the neural network based classification model based on a loss metric comparing the training output probability distribution and a value of the first data attribute from the at least one data record of the first set data records;

generating, from the neural network based classification model, a conditional distribution of a predicted value of the first non-numeric data attribute that belongs to the first financial record from the first financial database using an input of the input set of tokens comprising at least the second non-numeric data attribute in the second financial data record from the second database and the data attributes from the third data record that is from the third database;

determining whether the first non-numeric data attribute is an anomaly based on the conditional distribution of the predicted value of the first financial data attribute among the set of candidate values;

determining, from the second database, a fourth financial data record as related to a second non-numeric data attribute of the first financial data record; and generating, by the trained neural network based classification model, a joint conditional probability distribution for the first non-numeric data attribute and the second non-numeric data attribute, wherein the joint conditional probability distribution indicates whether a combination of actual values of the first non-numeric data attribute and the second non-numeric data attribute in the first financial data record is an anomaly; and generating an output message including the conditional distribution of the first non-numeric data attribute or the joint conditional probability distribution.

* * * * *